(12) United States Patent
Svenér et al.

(10) Patent No.: US 9,955,315 B2
(45) Date of Patent: Apr. 24, 2018

(54) INDOOR LOCATION DETECTION USING COMBINED RADIO FREQUENCY SIGNAL AND AUDIO FREQUENCY SIGNAL BEACON SYSTEM

(71) Applicant: Sony Mobile Communications Inc., Tokyo (JP)

(72) Inventors: Johan Svenér, Lund (SE); Peter C. Karlsson, Lund (SE); Magnus Persson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 32 days.

(21) Appl. No.: 14/689,732

(22) Filed: Apr. 17, 2015

(65) Prior Publication Data

US 2016/0309303 A1    Oct. 20, 2016

(51) Int. Cl.
*H04W 24/00* (2009.01)
*H04W 4/04* (2009.01)
*G01S 5/02* (2010.01)

(52) U.S. Cl.
CPC ............ *H04W 4/04* (2013.01); *G01S 5/0257* (2013.01)

(58) Field of Classification Search
CPC ............... G01S 5/02; G01S 3/14; H04W 4/02
USPC ................................ 455/456.1; 342/458, 386
See application file for complete search history.

(56) References Cited

U.S. PATENT DOCUMENTS

| 5,014,340 A | * | 5/1991 | Wren | G01S 1/685 455/1 |
| 2013/0288706 A1 | * | 10/2013 | Yu | H04W 4/02 455/456.1 |
| 2013/0307729 A1 | * | 11/2013 | Stensland | G01S 3/14 342/386 |
| 2014/0253389 A1 | * | 9/2014 | Beauregard | G01S 5/02 342/458 |
| 2016/0309303 A1 | * | 10/2016 | Svener | G01S 5/0257 |

FOREIGN PATENT DOCUMENTS

WO    WO 2004/057361 A1    7/2004

OTHER PUBLICATIONS

Notification of Transmittal of the International Search Report and the Written Opinion of the International Searching Authority, or the Declaration, in corresponding PCT Application No. PCT/JP2015/005235, dated Feb. 2, 2016, 12 pages.
Priyantha et al., "The Cricket Location-Support System", $6^{th}$ ACM International Conference on Mobile Computing and Networking (ACM MOBICOM), Boston, MA, Aug. 2000, 12 pages.
Karlsson et al., "Sensor Fused Indoor Positioning Using Dual Band WiFi Signal Measurements", MSc Thesis, Department of Automatic Control, Lund University, 2014, 118 pages.

* cited by examiner

*Primary Examiner* — William D Cumming
(74) *Attorney, Agent, or Firm* — Myers Bigel, P.A.

(57) ABSTRACT

A mobile terminal is operated by receiving a first signal and a second signal, determining a signal strength of the first signal, and determining an indoor location of the mobile terminal based on the signal strength of the first signal and the second signal. The first signal is a radio frequency signal and the second signal is an audio frequency signal.

16 Claims, 3 Drawing Sheets

INDOOR LOCATION DETECTION USING COMBINED RADIO FREQUENCY SIGNAL AND AUDIO FREQUENCY SIGNAL BEACON SYSTEM

BACKGROUND

The present invention relates to location detection and, more particular, to location detection of electronic devices in indoor environments.

In many outdoor environments, the Global Navigation Satellite System (GNSS), of which the Global Positioning System (GPS) is a part, provides locations for electronic devices, such as mobile terminals, with an accuracy of around 15 meters. These types of systems use satellites to function, and, in obstructed outdoor and indoor areas, the satellite signals may be too weak to enable accurate positioning. One approach to performing indoor location detection is to place a radio frequency beacon, such as a BLUETOOTH™ low energy beacon, at suitable locations in the indoor facility. Placing one beacon in each room, for example, may theoretically provide room level accuracy of the location of a mobile device by scanning for hearable beacons and selecting the one with the strongest signal as the indoor location. In practice, radio waves and multi-path components from beacons in other rooms can in many cases be stronger than the beacon in the room that the user of the mobile terminal is in. To address this problem, trilateration of several hearable beacons and/or fingerprinting algorithms based on signal strength reference data collected may be used. These fingerprinting techniques may be sensitive to environmental or people density changes and may require periodic recalibrations of the reference data. Techniques using beacons that transmit audio signals, such as ultrasound signals, may also be used for device location detection, but these techniques may be limited as the ultrasound signals may be blocked by walls or other structures. Moreover, the ultrasound signals may have bandwidth limitations that may make it more difficult to transmit data to uniquely identify a transmitting beacon.

SUMMARY

According to some embodiments of the inventive subject matter, a mobile terminal is operated by receiving a first signal and a second signal, determining a signal strength of the first signal, and determining an indoor location of the mobile terminal based on the signal strength of the first signal and the second signal. The first signal is a radio frequency signal and the second signal is an audio frequency signal.

In still other embodiments, the first signal is a BLUETOOTH™ signal and the second signal is an ultrasound signal.

In still other embodiments, the first signal and the second signal are transmitted by a same transmitter beacon.

In still other embodiments, the first signal and the second signal are transmitted by different transmitter beacons.

In still other embodiments, determining the signal strength of the first signal comprises determining a Received Signal Strength Indicator (RSSI) measurement of the first signal.

In still other embodiments, the method further comprises receiving a third signal, determining a signal strength of the third signal, and determining the indoor location of the mobile terminal based on the signal strength of the first signal, the signal strength of the third signal, and the second signal. The third signal is a radio frequency signal.

In still other embodiments, the second signal comprises a code that identifies a transmitter beacon that transmitted the second signal.

In still other embodiments, the code is a Media Access Control (MAC) address.

In still other embodiments, the indoor location is a region in a structure defined by at least one wall.

In further embodiments of the inventive subject matter, a mobile terminal comprises a processor and a memory coupled to the processor and comprising computer readable program code embodied in the memory that when executed by the processor causes the processor to perform operations comprising: receiving a first signal and a second signal, determining a signal strength of the first signal, and determining an indoor location of the mobile terminal based on the signal strength of the first signal and the second signal. The first signal is a radio frequency signal and the second signal is an audio frequency signal.

In still further embodiments, the first signal is a BLUETOOTH™ signal and the second signal is an ultrasound signal.

In still further embodiments, the first signal and the second signal are transmitted by a same transmitter beacon.

In still further embodiments, the first signal and the second signal are transmitted by different transmitter beacons.

In still further embodiments, determining the signal strength of the first signal comprises determining a Received Signal Strength Indicator (RSSI) measurement of the first signal.

In still further embodiments, the operations further comprise receiving a third signal, determining a signal strength of the third signal, and determining the indoor location of the mobile terminal based on the signal strength of the first signal, the signal strength of the third signal, and the second signal. The third signal is a radio frequency signal.

In still further embodiments, the second signal comprises a code that identifies a transmitter beacon that transmitted the second signal.

In still further embodiments, the code is a Media Access Control (MAC) address.

In still further embodiments, the indoor location is a region in a structure defined by at least one wall.

In other embodiments of the inventive subject matter, a computer program product for operating a mobile terminal comprises a tangible computer readable storage medium comprising computer readable program code embodied in the medium that when executed by a processor causes the processor to perform operations comprising: receiving a first signal and a second signal, determining a signal strength of the first signal, and determining an indoor location of the mobile terminal based on the signal strength of the first signal and the second signal. The first signal is a radio frequency signal and the second signal is an audio frequency signal.

In still other embodiments, the operations further comprise receiving a third signal, determining a signal strength of the third signal, and determining the indoor location of the mobile terminal based on the signal strength of the first signal, the signal strength of the third signal, and the second signal. The third signal is a radio frequency signal.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
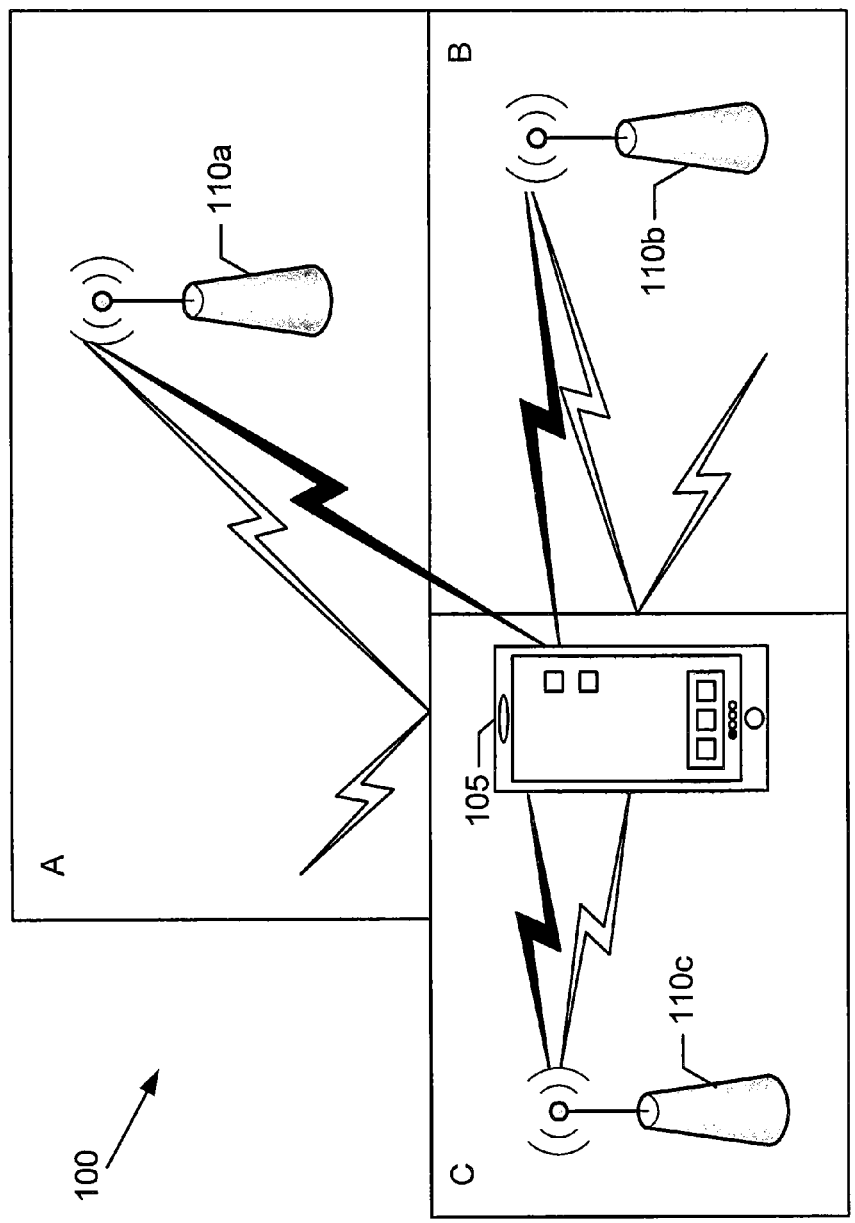
FIG. 1 is a diagram of an indoor facility in which a combined radio frequency signal and audio frequency signal beacon system is used to allow an electronic device/mobile terminal to detect its location in accordance with some embodiments of the inventive subject matter.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that is configured to receive and process signals from one or more transmitting beacons in which at least two of the signals are generally uncorrelated with one another, such as a radio frequency signal and an audio frequency signal.

Some embodiments of the inventive subject matter arise from a realization that by using multiple, generally uncorrelated signals transmitted from a beacon system a location of an electronic device/mobile terminal can be more accurately determined. For example, in an indoor location, a radio frequency signal can be used and an audio frequency signal (e.g., ultrasound) can be transmitted from one or more beacon systems. An electronic device/mobile terminal can listen for these signals and determine a signal strength for the radio frequency signals that are received. Because the radio frequency signals can penetrate walls and other structures, the closest beacon may actually be in another room or region of the facility. The audio or ultrasound signal may be substantially blocked by walls or other structure. Thus, the location of the beacon associated with an audio frequency signal that is received may be indicative of the particular room in the facility that the electronic device/mobile terminal is located. Distance estimates based on round trip delay times for the audio/ultrasound signals and round trip delay times and/or signal strength measurements for the radio frequency signals can be used to further pinpoint the location of the electronic device/mobile terminal in the room or area.

FIG. 1 is a diagram of an indoor facility in which a combined radio frequency signal and audio frequency signal beacon system is used to allow an electronic device/mobile device to detect its location in accordance with some embodiments of the inventive subject matter. Referring to FIG. 1, an indoor facility 100 includes three regions or rooms A, B, and C that are defined by walls. The indoor facility further includes a beacon system that comprises three beacons 110a, 110b, and 110c that are placed in the three different rooms A, B, and C, respectively. Each of the beacons 110a, 110b, and 110c includes transceivers that can transmit and receive both a radio frequency signal and an audio frequency signal, such as an ultrasound signal. The radio frequency signals may be BLUETOOTH™ low energy signals, Wi-Fi signals, or other suitable radio frequency signal type in accordance with various embodiments of the inventive subject matter. The radio frequency signals are illustrated by the solid signal lines and may be capable of penetrating structures, such as walls in the facility 100. The audio frequency signals are illustrated by the unfilled lines and may be substantially blocked by structures in the facility 100, such as walls and other structures. An electronic device/mobile terminal 105 may be configured to receive both the radio frequency signals and the audio frequency signals from the beacons 110a, 110b, and 110c. As shown in FIG. 1, the electronic device/mobile device 105 receives radio frequency signals from all three of the beacons 110a, 110b, and 110c. The electronic device/mobile device 105 receives an audio frequency signal only from the beacon 110c in room C. The audio frequency signals from beacons 110a and 110b are substantially blocked by walls defining the room C.

The electronic device/mobile terminal 105 may be further configured with transceivers for receiving and transmitting both radio frequency signals and audio frequency signals from the beacons 110a, 110b, and 110c in the facility 100. The electronic device/mobile terminal 105 may use the signal strength of one or more of the radio frequency signals along with the audio frequency signal(s) received to allow the electronic device/mobile terminal 105 to determine its location in the facility 100.

Although FIG. 1 illustrates exemplary communication between an electronic device/mobile terminal 105 and beacon systems 110a, 110b, and 110c, it will be understood that embodiments of the inventive subject matter are not limited to such configurations, but are intended to encompass any configuration capable of carrying out the operations described herein.

Figure 2:
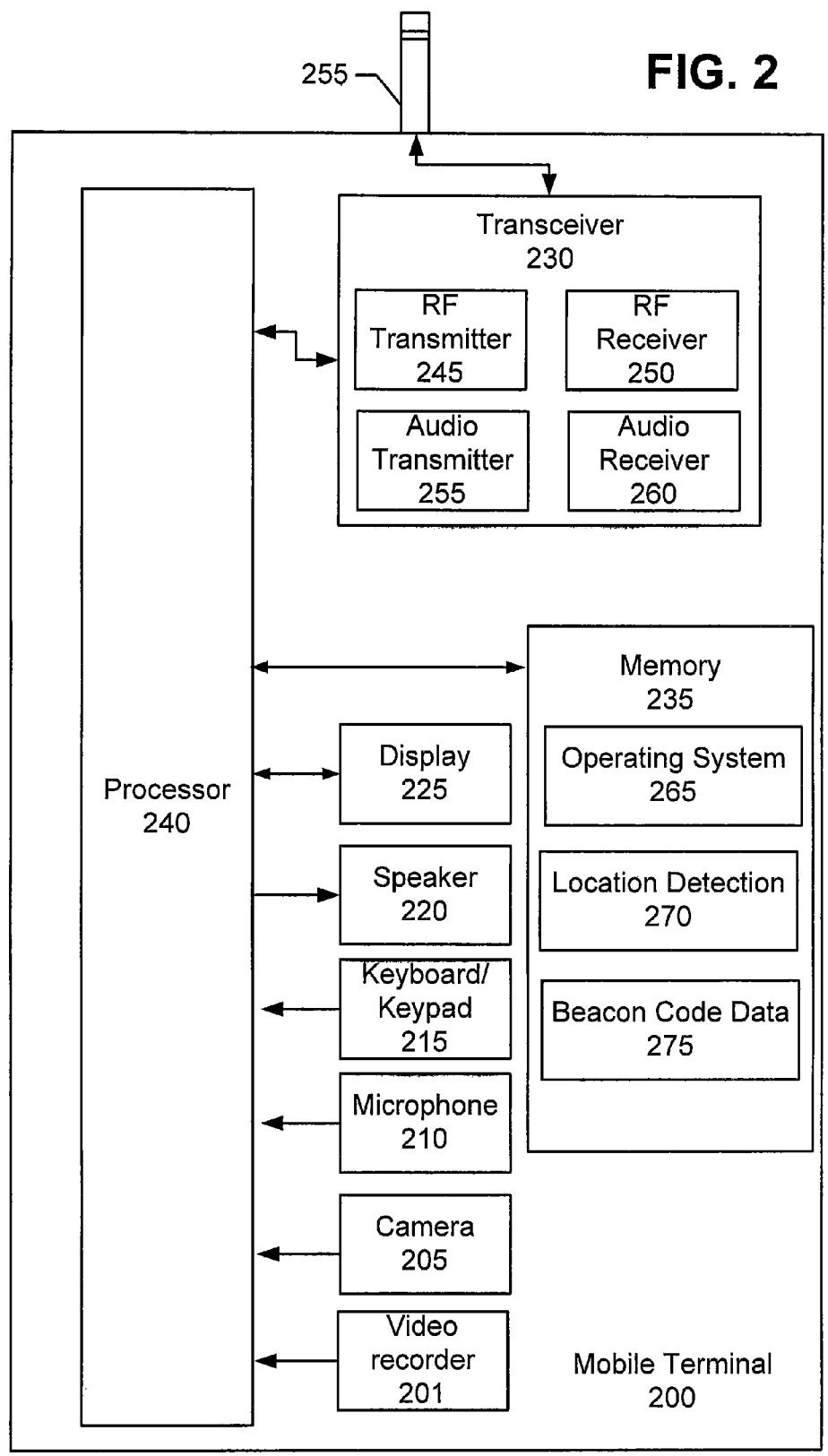
FIG. 2 is a block diagram that illustrates an electronic device/mobile terminal in accordance with some embodiments of the inventive subject matter.

Referring now to FIG. 2, an exemplary mobile terminal 200 that may be used to implement a device, such as the electronic device 105 of FIG. 1, in accordance with some embodiments of the inventive subject matter, includes a video recorder 201, a camera 205, a microphone 210, a keyboard/keypad 215, a speaker 220, a display 225, a transceiver 230, and a memory 235 that communicate with a processor 240. The transceiver 230 comprises a radio frequency transmitter circuit 245 and a radio frequency receiver circuit 250, which respectively transmit outgoing radio frequency signals to base station transceivers and receive incoming radio frequency signals from the base station transceivers via an antenna 255. The radio frequency signals transmitted between the mobile terminal 200 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. In accordance with some embodiments of the inventive subject matter, the radio frequency signals may comprise those signals transmitted from the beacons 110a, 110b, and 110c of FIG. 1, such as low energy BLUETOOTH™ signals, Wi-Fi signals, and the like. The transceiver further comprises an audio frequency transmitter circuit 255 and an audio frequency receiver circuit 260, which may be configured to receive audio frequency signals from and transmit audio frequency signals to the beacons 110a, 110b, and 110c of FIG. 1. The audio frequency signals may be, for example, ultrasound signals in accordance with some embodiments of the inventive subject matter. The foregoing components of the mobile terminal 200 may be included in many conventional mobile terminals and their functionality is generally known to those skilled in the art.

The processor 240 communicates with the memory 235 via an address/data bus. The processor 240 may be, for example, a commercially available or custom microprocessor. The memory 235 is representative of the one or more memory devices containing the software and data used to operate the mobile terminal 200. The memory 235 may include, but is not limited to, the following types of devices: cache, ROM, PROM, EPROM, EEPROM, flash, SRAM, and DRAM.

As shown in FIG. 2, the memory 235 may contain three or more categories of software and/or data: the operating system 265, a location detection module 270, and/or a beacon code data module 275. The operating system 265 generally controls the operation of the mobile terminal 200. In particular, the operating system 265 may manage the mobile terminal's software and/or hardware resources and may coordinate execution of programs by the processor 240.

The location detection module 270 may be configured to process both radio frequency and audio frequency signals received through the transceiver. In some embodiments of the inventive subject matter, the location detection module 270 may be configured to measure the signal strength of received radio frequency signals, such as those transmitted by the beacons 110a, 110b, and 110c of FIG. 1. The measurement of the signal strength may be, for example, a Received Signal Strength Indicator (RSSI) measurement. The radio frequency signals may include code information that identifies the particular beacon 110a, 110b, and 110c that transmitted the signal. The beacon may be identified, for example, by a short code that uniquely identifies the beacon 110a, 110b, 110c or by a long code, such as the Media Access Control (MAC) address of the beacon 110a, 110b, 110c. The beacon code data module 275 may represent the one or more data structures/databases used to associate codes or unique identifiers with the various beacons along with their locations in the indoor facility 100. The location detection module 270 may also detect received audio frequency signals, such as those transmitted by the beacons 110a, 110b, and 110c and may process these signals to obtain a code that identifies transmitting beacon 110a, 110b, 110c. Because of the lower bandwidth of an audio frequency signal a short code may be used to identify the transmitting beacon 110a, 110b, 110c of the audio frequency signal. The code may only need to be unique within the transmitting range of the beacon 110a, 110b, 110c for the audio frequency signal. The MAC address may also be used as the code in the audio frequency signal as it can uniquely identify the beacon 110a, 110b, 110c and an additional database mapping the codes to beacons may not be necessary as the MAC addresses of the beacons 110a, 110b, 110c are typically maintained in various data structures/databases used in communication networks in the facility 100. Thus, the location detection module 270 may maintain and/or access a data structure/database that associates radio frequency signal codes and audio frequency signal codes with the various beacons 110a, 110b, 110c along with their locations, e.g., rooms A, B, C in the facility 100.

The location detection module 270 may be further configured to communicate with the beacons 110a, 110b, 110c using radio frequency signals and/or audio frequency signals, such as those transmitted by the beacons 110a, 110b, 110c, to calculate delay times that can be used to determine the distance the mobile terminal 200 is from a particular beacon. Because the audio frequency signals travel at a lower speed that the radio frequency signals they may provide improved accuracy for determining the distance from the mobile terminal 200 to the beacons 110a, 110b, 110c. In some embodiments of the inventive subject matter, the location detection module 270 may include trilateration functionality to determine a location of the mobile terminal 200 based on multiple ones of the radio frequency signals and/or audio frequency signals from the beacons 110a, 110b, 110c.

Although FIG. 2 illustrates an exemplary software and hardware architecture that may be used by an electronic device, such as a mobile terminal, to determine its location using a combined radio frequency signal and audio frequency signal beacon system in accordance with some embodiments of the inventive subject matter, it will be understood that the present invention is not limited to such a configuration, but is intended to encompass any configuration capable of carrying out the operations described herein.

Computer program code for carrying out operations of data processing systems described above with respect to FIGS. 1 and 2 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the electronic device/mobile device 105 of FIG. 1 and/or mobile terminal 200 of FIG. 2 may be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

The data processing apparatus of FIGS. 1 and 2 may be used to facilitate location detection of an electronic device/mobile device using a combined radio frequency signal and audio frequency signal beacon system according to various embodiments described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 235 coupled to the processor 240 includes computer readable program code that, when executed by the processor, causes the processor to perform operations including one or more of the operations described herein with respect to FIGS. 3 and 4.

Figure 3:
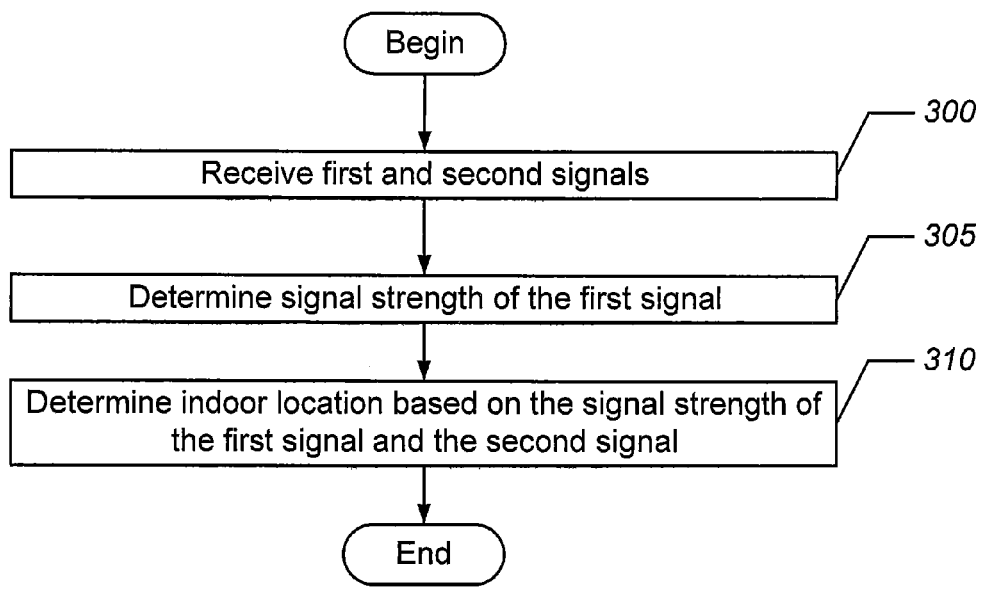
FIGS. 3 and 4 are flowcharts that illustrate operations for detecting the location of an electronic device/mobile terminal using a combined radio frequency signal and audio frequency signal beacon system in accordance with some embodiments of the inventive subject matter.
Figure 4:
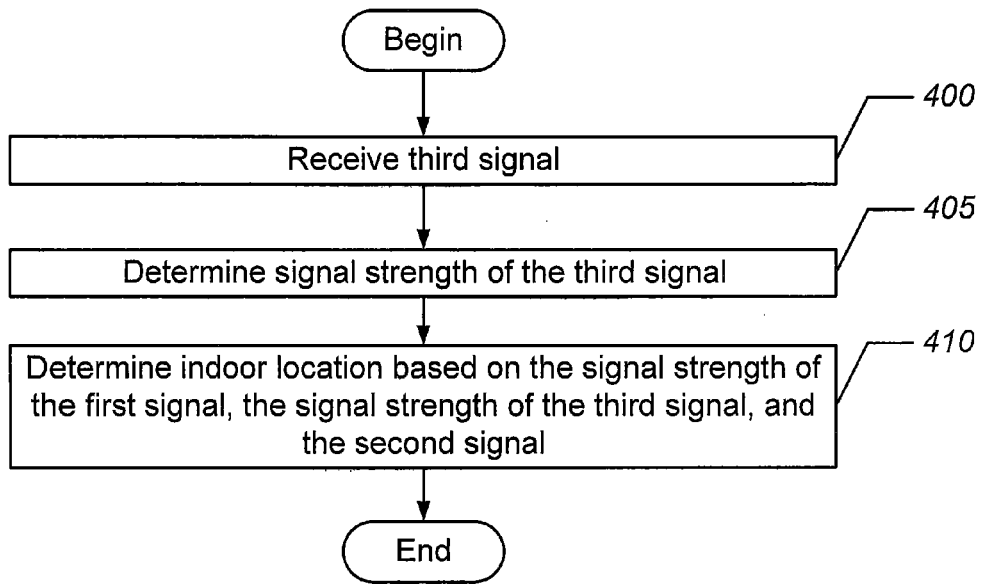

FIGS. 3 and 4 are flowcharts that illustrate operations for detecting the location of an electronic device/mobile terminal using a combined radio frequency signal and audio frequency signal beacon system in accordance with some embodiments of the inventive subject matter. Referring to FIG. 3, operations begin at block 300 where an electronic device/mobile terminal 105 receives first and second signals from one or more beacons 110a, 110b, 110c. The first and second signals may be generally uncorrelated signals, such as a radio frequency signal (e.g., BLUETOOTH™ or Wi-Fi signal) and an audio frequency signal (e.g., an ultrasound signal). The location detection module 270 in the electronic device/mobile terminal 105 determines a signal strength for the first signal, i.e., the radio frequency signal at block 305. In some embodiments of the inventive subject matter, the signal strength determination may be an RSSI measurement. Because radio frequency signals can penetrate structures, such as walls, the radio frequency signal that is received at the electronic device/mobile terminal 105 that has the strongest signal strength may actually be located in another room. To detect a more accurate location for the electronic device/mobile terminal 105, the location detection module 270 uses both the signal strength determination for the first signal along with the second signal, which may correspond to an audio frequency signal to determine the indoor location at block 310.

Referring now to FIG. 4, because the radio frequency signals can penetrate structures, the electronic device/mobile terminal 105 may receive multiple radio frequency signals. Thus, the electronic device/mobile terminal 105 may receive a third signal at block 400, which is a radio frequency signal. At block 405, the location detection module 270 determines the signal strength of the third signal (e.g., RSSI measurement) and the indoor location is determined at block 410 based on the signal strengths of the first and third radio frequency signals along with the second signal, which is an audio frequency signal. For example, as shown in FIG. 1, the signal strength of the radio frequency signal from beacon 110b (first signal) may be determined to be stronger than the radio frequency signal from beacon 110c (third signal) at the electronic device/mobile terminal 105. The location detection module 270 may, however, determine that the electronic device/mobile terminal 105 is actually in room C because the only audio frequency signal (second signal) that the mobile device/mobile terminal 105 receives is from the beacon 110c.

In some embodiments, to obtain an even more accurate estimate of the location of the electronic device/mobile terminal 105, the location detection module 270 may use trilateration and/or signal delay analysis based on the radio frequency signals and/or audio frequency signals received from the beacons 110a, 110b, 110c along with knowledge of the positioning of the various beacons 110a, 110b, 110c in the indoor facility 100.

Some embodiments of the inventive subject matter may provide an indoor location detection capability for an electronic device/mobile terminal that uses a combined radio frequency and audio frequency beacon system. The electronic device/mobile terminal may scan for radio frequency signals and obtain a rough location based on the relative signal strengths of the radio frequency signals received from various beacons. A more accurate determination of the location can then be determined by scanning for audio frequency signals. Because the audio frequency signals do not penetrate structures as well as radio frequency signals, the electronic device/mobile terminal is most likely in the room or region of a facility in which beacon transmitting a received audio frequency signal is located. An even more accurate determination of the location of the electronic device/mobile terminal may be made based on trilateration and/or signal delay analysis techniques applied to the received radio frequency and/or audio frequency signals.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method of operating a mobile terminal, comprising:
   receiving a radio frequency signal and determining a signal strength of the radio frequency signal;
   receiving only one of a first audio frequency signal that is transmitted by a first transmitter beacon and a second audio frequency signal that is transmitted by a second transmitter beacon; and
   determining an indoor location of the mobile terminal based on the signal strength of the radio frequency signal and a determination of which one of the first and second audio frequency signals are received,
   wherein the indoor location is a first region on a first side of a structure,
   wherein the first audio frequency signal is transmitted by the first transmitter beacon within the first region,
   wherein the second audio frequency signal is transmitted by the second transmitter beacon within a second region that is on an opposite side of the structure, and
   wherein determining the indoor location of the mobile terminal comprises determining that the mobile terminal is within the first region based on the signal strength of the radio frequency signal, a determination that the first audio frequency signal is received, and a determination that the second audio frequency signal is not received.

2. The method of claim 1, wherein the radio frequency signal and the received one of the first and second audio frequency signals are transmitted by a same transmitter beacon.

3. The method of claim 1, wherein the radio frequency signal and the received one of the first and second audio frequency signals are transmitted by different transmitter beacons.

4. The method of claim 1, wherein determining the signal strength of the radio frequency signal comprises determining a Received Signal Strength Indicator (RSSI) measurement of the radio frequency signal.

5. The method of claim 1, wherein the radio frequency signal is a first radio frequency signal, the method further comprising:
   receiving a second radio frequency signal and determining a signal strength of the second radio frequency signal,
   wherein the determining the indoor location of the mobile terminal is based on the signal strength of the first radio frequency signal, the signal strength of the second radio frequency signal, and the determination of which one of the first and second audio frequency signals are received.

6. The method of claim 1, wherein the received one of the first and second audio frequency signals comprises a code that identifies a transmitter beacon that transmitted the received one of the first and second audio frequency signals.

7. The method of claim 6, wherein the code is a Media Access Control (MAC) address.

8. A mobile terminal, comprising:
   a processor; and
   a memory coupled to the processor and comprising computer readable program code embodied in the memory that when executed by the processor causes the mobile terminal to perform operations comprising:
   receiving a radio frequency signal and determining a signal strength of the radio frequency signal;
   receiving only one of a first audio frequency signal that is transmitted by a first transmitter beacon and a second audio frequency signal that is transmitted by a second transmitter beacon; and
   determining an indoor location of the mobile terminal based on the signal strength of the radio frequency signal and a determination of which one of the first and second audio frequency signals are received,
   wherein the indoor location is a first region in a structure defined by at least one wall,
   wherein the first audio frequency signal is transmitted by the first transmitter beacon within the first region,
   wherein the second audio frequency signal is transmitted by the second transmitter beacon within a second region that is on an opposite side of the wall, and
   wherein determining the indoor location of the mobile terminal comprises determining that the mobile terminal is within the first region based on the signal strength of the radio frequency signal, a determination that the first audio frequency signal is received, and a determination that the second audio frequency signal is not received.

9. The mobile terminal of claim 8, wherein the radio frequency signal and the received one of the first and second audio frequency signals are transmitted by a same transmitter beacon.

10. The mobile terminal of claim 8, wherein the radio frequency signal and the received one of the first and second audio frequency signals are transmitted by different transmitter beacons.

11. The mobile terminal of claim 8, wherein determining the signal strength of the radio frequency signal comprises determining a Received Signal Strength Indicator (RSSI) measurement of the radio frequency signal.

12. The mobile terminal of claim 8,
   wherein the radio frequency signal is a first radio frequency signal,
   wherein the operations further comprise receiving a second radio frequency signal and determining a signal strength of the second radio frequency signal, and
   wherein the determining the indoor location of the mobile terminal is based on the signal strength of the first radio frequency signal, the signal strength of the second radio frequency signal, and the determination of which one of the first and second audio frequency signals are received.

13. The mobile terminal of claim 8, wherein the received one of the first and second audio frequency signals comprises a code that identifies a transmitter beacon that transmitted the received one of the first and second audio frequency signals.

14. The mobile terminal of claim 13, wherein the code is a Media Access Control (MAC) address.

15. A computer program product for operating a mobile terminal, comprising:
   a non-transitory computer readable storage medium comprising computer readable program code embodied in the medium that when executed by a processor causes the mobile terminal to perform operations comprising:
   receiving a radio frequency signal and determining a signal strength of the radio frequency signal;
   receiving only one of a first audio frequency signal that is transmitted by a first transmitter beacon and a second audio frequency signal that is transmitted by a second transmitter beacon; and
   determining an indoor location of the mobile terminal based on the signal strength of the radio frequency signal and a determination of which one of the first and second audio frequency signals are received, wherein the indoor location is a first region on a first side of a structure, wherein the first audio frequency signal is transmitted by the first transmitter beacon within the first region, wherein the second audio frequency signal is transmitted by the second transmitter beacon within a second region that is on an opposite side of the structure, and wherein determining the indoor location of the mobile terminal comprises determining that the mobile terminal is within the first region based on the signal strength of the radio frequency signal, a determination that the first audio frequency signal is received, and a determination that the second audio frequency signal is not received.

16. The mobile terminal of claim 15, wherein the radio frequency signal is a first radio frequency signal, Wherein the operations further comprise receiving a second radio frequency signal and determining a signal strength of the second radio frequency signal, and wherein the determining the indoor location of the mobile terminal is based on the signal strength of the first radio frequency signal, the signal strength of the second radio frequency signal, and the determination of which one of the first and second audio frequency signals are received.

* * * * *

UNITED STATES PATENT AND TRADEMARK OFFICE
CERTIFICATE OF CORRECTION

PATENT NO. : 9,955,315 B2
APPLICATION NO. : 14/689732
DATED : April 24, 2018
INVENTOR(S) : Svenér et al.

Page 1 of 1

It is certified that error appears in the above-identified patent and that said Letters Patent is hereby corrected as shown below:

In the Claims

Column 13, Claim 16, Line 20: Please correct "Wherein the operations" to read -- wherein the operations --

Signed and Sealed this
Sixth Day of November, 2018

Andrei Iancu
*Director of the United States Patent and Trademark Office*